Figure 1:
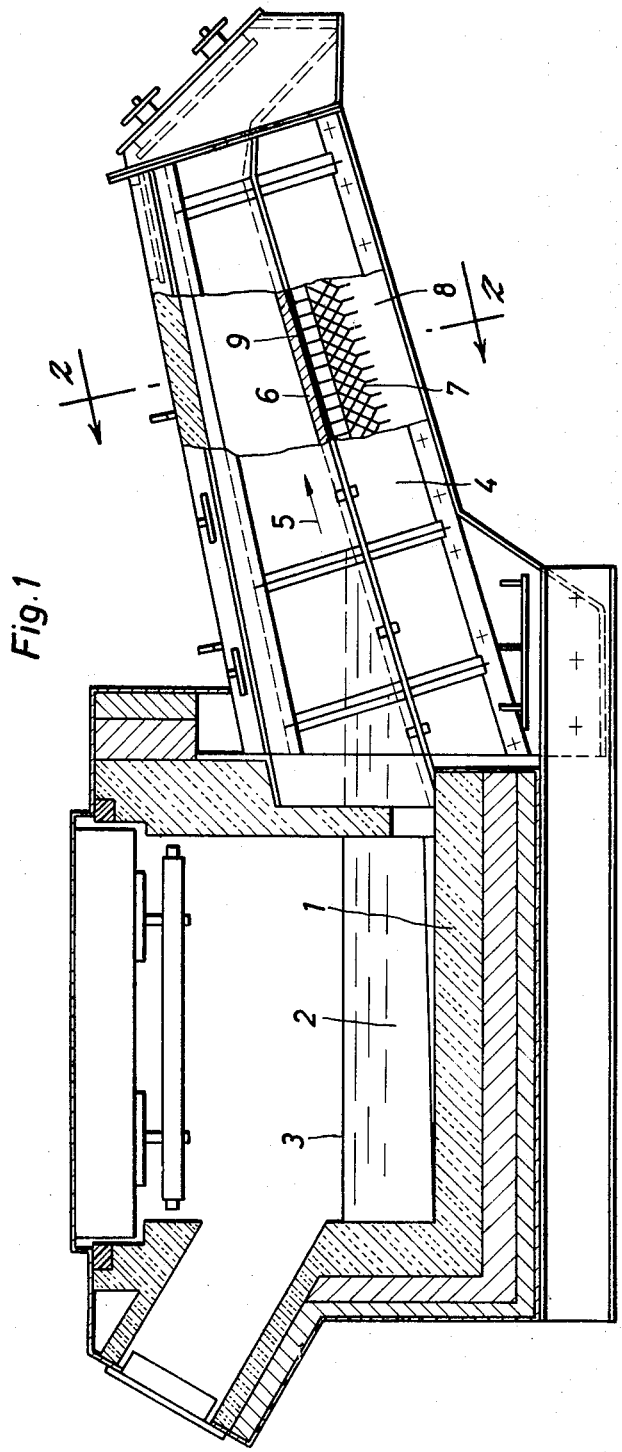

United States Patent
von Starck

[15] 3,684,402
[45] Aug. 15, 1972

[54] CONVEYOR TROUGH
[72] Inventor: Axel von Starck, Remscheid-Luttringhausen, Germany
[73] Assignee: AEG-Elotherm GmbH, Remscheid-Hasten, Germany
[22] Filed: Oct. 16, 1970
[21] Appl. No.: 81,425

[30] Foreign Application Priority Data
Nov. 28, 1969    Germany..........P 19 59 655.5

[52] U.S. Cl. ................................417/50
[51] Int. Cl. ................................F04b 17/00
[58] Field of Search ....................417/48, 50

[56] References Cited

UNITED STATES PATENTS

| | | | |
|---|---|---|---|
| 2,490,009 | 11/1949 | Thomas | 417/50 |
| 2,808,002 | 10/1957 | Erwin | 417/50 |
| 2,865,291 | 12/1958 | Watt | 417/50 |
| 2,987,001 | 6/1961 | Blake | 417/50 |
| 2,985,106 | 5/1961 | Rhudy | 417/50 |
| 3,242,354 | 3/1966 | Novack et al. | 310/11 |

FOREIGN PATENTS OR APPLICATIONS

| | | | |
|---|---|---|---|
| 103,149 | 4/1958 | Netherlands | 417/50 |
| 1,286,701 | 1/1969 | Germany | 417/50 |

Primary Examiner—William L. Freeh
Attorney—Cushman, Darby & Cushman

[57] ABSTRACT

An electromagnetic conveyor of the type having a trough, induction coils mounted beneath the trough for inducing currents in any metal in the trough so that the metal is propelled along the trough by the resultant forces, and a shield mounted between the trough and coils for protecting the coils against dirt and metal breakout from the trough. In the embodiment of the invention described below, the shield is comprised of preferably non-magnetic metal layers separated by insulation so that heating of the shield is minimized. The layers may each consist of a number of sets of metal laminations with insulation separating each set and with the layers extending perpendicular to the trough bottom and cross-wise to the metal flow. Alternately, metal layers separated by insulation can be mounted parallel to the trough bottom with each layer having insulation filled slots or separations. In this arrangement, adjacent slots or separations are preferably offset.

5 Claims, 7 Drawing Figures

Inventor:
AXEL VON STARCK

Inventor:
AXEL VON STARCK

BY Cushman, Darby Cushman
ATTORNEYS

CONVEYOR TROUGH

This invention relates to an electromagnetic conveyor for liquid metal.

Such conveyors have been used with success for many years for propelling molten metal up an inclined trough which preferably has a refractory lining with a series of induction coils located underneath. The currents induced in any metal in the trough by the application of a suitable electrical signal to the coils interact with the currents in the coils to generate forces which propel the metal along the conveyor. The coils are usually disposed so that a travelling electromagnetic field results when a suitable signal is applied to the coils.

Between the coils which form the travelling field inductor and the body of the conveyor it is the usual practice to interpose as of non-magnetic material, generally austenitic steel. The purpose of this sheet is to prevent dirt, and, particularly in the event of a breakout of liquid metal from the conveyor, liquid metal from gaining access to the windings of the coils. This sheets, commonly termed a shield, must not be too thin if it is to withstand the mechanical stresses and any possible attack by the melt.

In addition, eddy currents generated in the shield by the travelling field heat the shield and thus weaken its ability to withstand such stresses and possible attacks by the melt. In smaller conveyor troughs such heat can be satisfactorily dissipated by the cooling system which is usually used for the induction coils. However, in conveyor troughs of larger size the temperature rise of the shield cannot be satisfactorily limited in this way, and the shield temperature may rise to the point where the insulation of the adjacent windings is destroyed, and the shield itself may be damaged.

It is an object of the present invention to provide means which, without interfering with the simple construction of such an electromagnetic conveyor, keeps the temperature of the shield at a low level and at the same time has the necessary mechanical strength and protective capability to prevent breakout of the melt to the windings.

According to one embodiment of the invention of this application, a shield is provided comprising at least two non-magnetic sheet metal layers with insulation between them which may for example be a synthetic plastics material, or a ceramic material. Such a composite structure can be so contrived, with due regard to existing electrical conditions, so that it will not heat up significantly, or not heat up to temperatures which adversely affect the conveyor components. Moreover the mechanical and technical properties may be such that the arrangement provides protection for the windings against melt breakout and in other respects.

In the composite structure of this invention the sheet metal layers preferably consist of laminations with interposed insulations extending perpendicular to the bottom of the trough. Alternatively the layers of sheet metal consist of laminations extending with interposed layers in insulation parallel to the bottom of the trough. In this arrangement, the metal sheets are transversely arranged with divisions or slots which are filled with an insulating material.

Moreover when the layers of sheet metal are arranged parallel to the bottom of the trough there are several possible ways of constructing the shield. The layers may comprise at least two metal strips and/or butt joints between the strips may be offset from layer to layer. Each sheet metal layer may consist of a metal sheet which is slotted alternately from opposite edges, and the slots in consecutive layers may be relatively offset. The slots in the sheets may be arranged to run to and fro, but in such an arrangement they are preferably relatively offset from sheet to sheet.

Joints filled with insulating material help keep the temperature within the desired limits, and the offsetting of the joints from layer to layer assures mechanical strength and safety against breakouts of liquid metal. The alternatives hereinbefore described permit the mechanically and electrothermally optimum form of construction to be chosen for any particular case.

Figure 2:
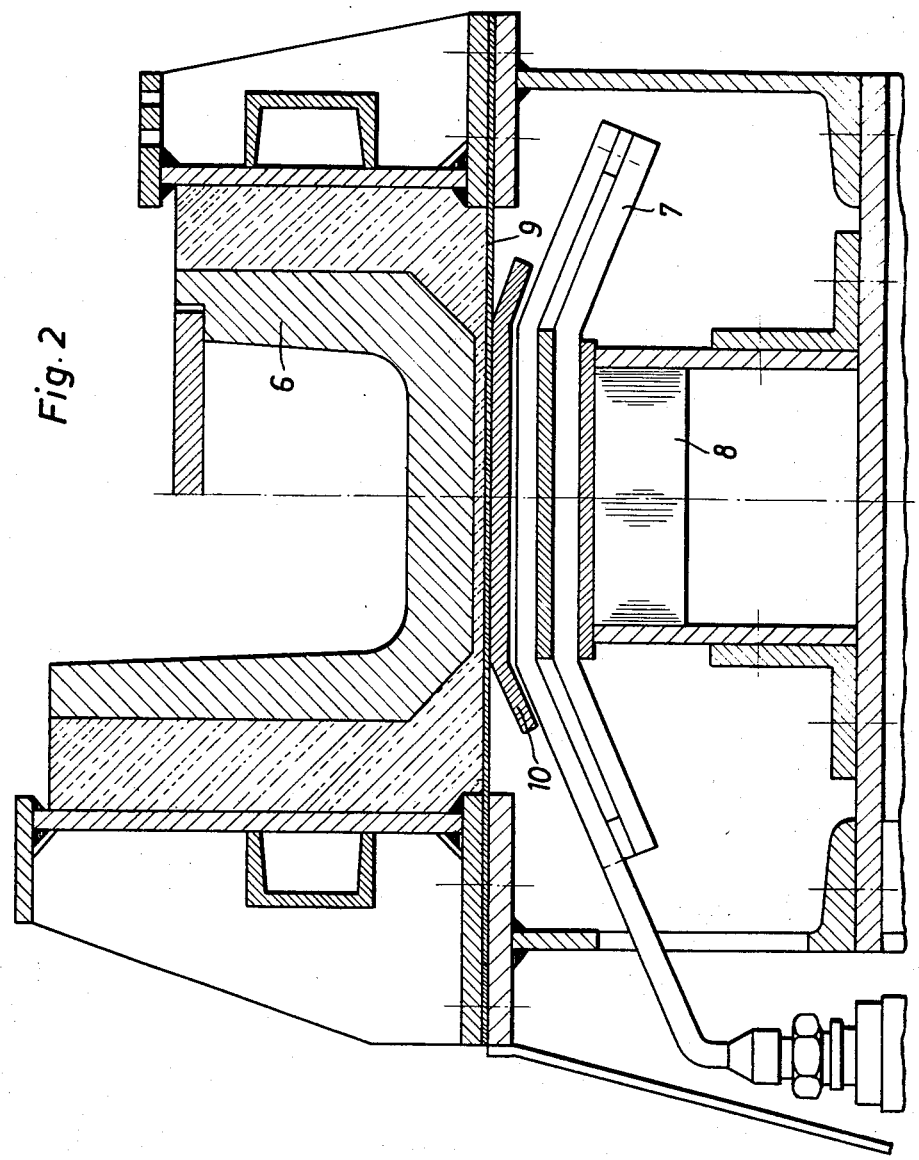
Figure 3:
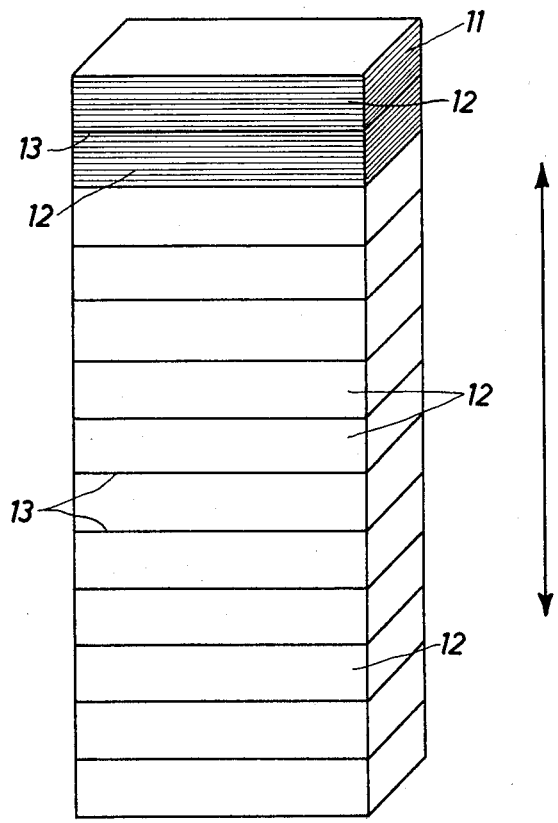
Figure 4:
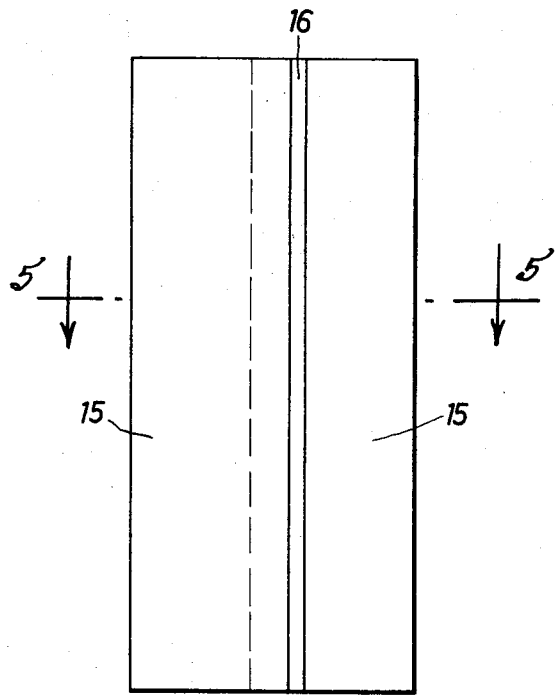
Figure 5:
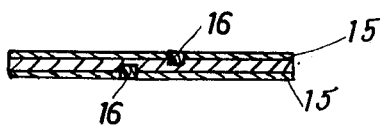
Figure 6:
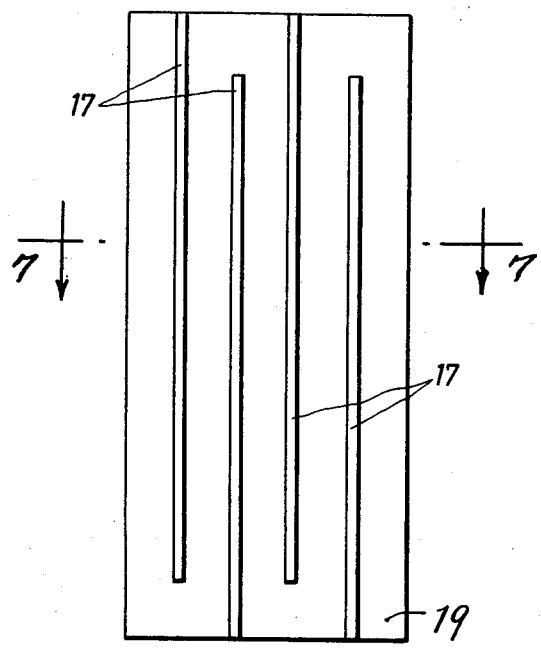
Figure 7:
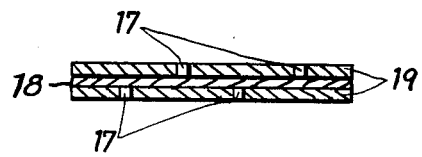

Embodiments of the invention are hereinafter described and illustrated in the accompanying drawings, of which:

FIG. 1 is a longitudinal section of an electromagnetic conveyor having a heat shield, FIG. 2 is a cross-section thereof along the lines 2—2', FIGS. 3 to 7 illustrate composite shields according to the invention for use in the conveyor such as shown in FIGS. 1 and 2, of which FIGS. 3 is a view of a composite shield according to the invention from above, FIG. 4 is a plan view of another embodiment of shield of the invention, FIG. 5 is a cross-section of FIG. 4 along the lines 5—5' and FIGS. 6 and 7 are plan and cross-sectional views along the lines 7—7' respectively of a further embodiment of the composite shield.

In the arrangement shown in FIGS. 1 nd 2, a conventional furnace 1 is shown filled with molten metal 2 to a level marked 3 and this metal is to tapped from the furnace. This is done with the aid of conventional electromagnetic conveyor 4 which conveys in the direction indicated by arrow 5. The conveyor 4 consists of an inclined trough-shaped body 6 of refractory material below which are mounted inductor coils. Only one winding 7 inserted into the slots of sheet metal laminations 8 is shown in FIGS. 1 and 2 of the drawings, but the windings are preferably at least two-phase.

Between the coils and laminations and the body 6 of the conveyor is a metal shield 9. As mentioned above, in the past this shield consisted of a single non-magnetic, preferably austenitic steel, sheet. Insulation is conventionally provided between shield 9 and the coils. As mentioned above the size of the conveyor and the large shield accordingly needed may be too large to permit the shield heat to be adequately dissipated by an inductor cooling system. A composite shield in which the temperature of the shield does not rise to a undesirable level is schematically shown in FIGS. 3 to 7. For the sake of convenience, the length of the composite shield is shown shorter in the drawings than it would be in actual practice.

As shown in FIG. 3 such a composite shield may consist of sheet metal laminations with interposed insulation. Separate packs 12 may be formed and stacked together with the interposition of layers of insulating material 13. The shield is then arranged so that the lamination is perpendicular to the bottom of the conveyor trough and preferably crosswise of the direction in which the molten metal is conveyed to impart the necessary high strength to the shield. The arrow shows the directions along which the metal would move with the shield so disposed.

In the embodiments of FIGS. 4 to 7 the composite shield contains sheet metal layers 15 which extend parallel to the bottom of the trough and separated by interposed insulation 14. In the plan view of FIG. 4, two sheet metal layers 15 are provided, the edges abutting at a joint 16 which joint is filled with any suitable insulating material, which is also present between the metal layers 15. Each layer can comprise any number of individual sheets. The joints 16, as will be understood from the section thereof shown in FIG. 5, are relatively offset from layer to layer. This arrangement combines mechanical strength with safety against the deleterious effects of a breakout of molten metal, particularly since a plurality of such sheet metal layers may be stacked together without causing dangerous heating during operation of the conveyor. It will of course be understood that any desired number of such layers can be used.

In FIGS. 6 and 7 the sheets forming the layer 15 are slotted from opposite edges, and separated by insulation 18. As in the other embodiment, each layer can have any number of individual sheets. These slots 17, which are filled with insulating material, are likewise relatively offset from layer to layer. In the embodiment of FIG. 3 the insulation acts to limit the eddy currents and hence resitive heating. In the embodiments of FIGS. 4 to 7 the insulation in the slots of divisions performs the same function.

The insulating material is preferably a heat-resistant synthetic plastic material, a ceramic, or other insulating material. Adhesives applied in suitably thick layers may also be used. The insulating materials are applied or sprayed and the composite shields can be produced by pressing, drying in the air, heating in a furnace or other step taken severally or in combination. Preferably the metal sheets consist of austenitic steel.

Many changes and modifications in the above embodiments of the invention of course can be made without departing from the scope of the invention. Accordingly, that scope is intended to be limited only by the scope of the appended claims.

What we claim is:

1. In an electromagnetic conveyor for liquid metal comprising a trough, having a refractory body induction coils thereunder and a shield between the bottom of the refractory body of the trough and the induction coils, the improvement wherein said shield is a composite body comprising at least two sheet metal layers of non-magnetic material and an electrically insulating material separating said layers, and wherein the sheet metal layers consists of sets of laminations with interposed layers of insulation between adjacent sets and with said layers extending parallel to the bottom of said trough body and having transverse divisions in each layer.

2. In a conveyor as in claim 1, the further improvement wherein the sheet metal layers each comprise at least two metal strips and that the butt joints between the edges of the said strips are relatively offset in adjacent layers, the edges of the said joints being insulated from each other.

3. In a conveyor as in claim 1, the further improvement wherein the sheet metal layers each consist of a metal sheet slotted alternately from opposite edges, said slots being filled with insulating material.

4. In a conveyor as in claim 3, the further improvement wherein said slots are relatively offset in adjacent layers.

5. In a conveyor as in claim 1, the further improvement wherein sheet metal layers each consist of a sheet with slots extending from opposite edges of the sheet, the said slots being relatively offset in adjacent layers and filled with insulating material.

* * * * *